(12) United States Patent
Brocco

(10) Patent No.: US 8,047,195 B2
(45) Date of Patent: Nov. 1, 2011

(54) MULTIWIRE SAWING MACHINE FOR THE CUTTING OF MATERIAL IN BLOCK FORM

(75) Inventor: Emilio Brocco, Lessolo (IT)

(73) Assignee: CO.FI.PLAST S.R.L., Lessolo (IT)

( * ) Notice: Subject to any disclaimer, the term of this patent is extended or adjusted under 35 U.S.C. 154(b) by 379 days.

(21) Appl. No.: 12/464,349

(22) Filed: May 12, 2009

(65) Prior Publication Data

US 2009/0288651 A1 Nov. 26, 2009

(30) Foreign Application Priority Data

May 22, 2008 (IT) .............................. TO2008A0385

(51) Int. Cl.
*B28D 1/08* (2006.01)
(52) U.S. Cl. ....................... 125/21; 125/16.02
(58) Field of Classification Search ............... 125/21, 125/16.01, 16.02, 14, 19, 17; *B28D 1/08, B28D 1/12*
See application file for complete search history.

(56) References Cited

U.S. PATENT DOCUMENTS

| | | | | |
|---|---|---|---|---|
| 2,958,323 | A * | 11/1960 | Knoph et al. | 125/21 |
| 5,907,988 | A * | 6/1999 | Kiuchi et al. | 83/651.1 |
| 6,109,253 | A * | 8/2000 | Ikehara | 125/12 |
| 7,082,940 | B2 * | 8/2006 | Takeuchi et al. | 125/21 |

FOREIGN PATENT DOCUMENTS

| | | |
|---|---|---|
| WO | 9900210 | 1/1999 |
| WO | WO 9900210 A1 * | 1/1999 |

* cited by examiner

*Primary Examiner* — Dung Van Nguyen
(74) *Attorney, Agent, or Firm* — Jason D. Voight

(57) ABSTRACT

The sawing machine comprises a guide pulley composed of a plurality of wheels of the same diameter, coaxial and mutually juxtaposed side by side in a pack on a corresponding shaft or the like According to the invention, in said wheel pack of the guide pulley (P2) a wheel (P21) presenting at least an external circumferential groove (P21') and a wheel (P22) presenting a plurality of external circumferential grooves (P22') are alternated in a repetitive sequence. Said wheels (P21, P22) comprise a radially internal part (P21.1, P22.1), at which they are mutually juxtaposed in a pack. Each wheel (P21) presenting at least a groove (P21') comprises a radially external part (P21.2) having an external annular rim (P21.3) of lesser width than the thickness of said internal part (P21.1) thereof, while each wheel (P22) presenting a plurality of grooves (P22') comprises a radially external part (P22.2) having an external annular rim (P22.3) of a width greater than the thickness of said internal part (P22.1) thereof, and which overlaps, laterally, partially and in a freely revolving manner, the radially internal part (P21.1) of each wheel (P21) adjacent and presenting at least a groove (P21')

4 Claims, 3 Drawing Sheets

MULTIWIRE SAWING MACHINE FOR THE CUTTING OF MATERIAL IN BLOCK FORM

This application claims priority to Italian Application No. TO2008A 385, filed May 22, 2008, which is incorporated by reference herein.

The present invention relates to a sawing machine with a plurality of wire tools for cutting material in blocks, such as stone material.

Over the years, sawing machines for cutting blocks of stone material or the like have become increasingly oriented towards the diamond wire cutting tool technology, which is gradually replacing the now obsolete and polluting frame sawing machines with reciprocating motion blades.

The construction of machines which use diamond wire as a tool has developed progressively, starting with "single wire" machines and subsequently progressing to "multi-wire" machines, i.e. sawing machines with a plurality of cutting tools consisting of diamond wires in a closed loop, wound on corresponding rollers or driving, guide and/or idle wheel "packs" or pulleys.

From the Italian utility model patent no. 236.075 filed on Jun. 26, 1997 by the inventor of the present invention, there is known a sawing machine of the type specified, in which a plurality of diamond wires (hereinafter "cutting wires") are wound in a closed loop and each made to circulate between a respective driving pulley and at least a respective driven pulley and wherein each cutting wire is disposed in a respective plane, for example vertical, substantially parallel to the planes in which the other cutting wires lie. The reciprocal distance between adjacent cutting wires and, consequently, the thickness of the slabs cut by these wires, is thus determined.

One of the most important problems in multi-wire machines is represented by the rapidity with which the thickness of the cut slabs can be changed. As already mentioned, as the thickness of the slabs is determined substantially by the distance between cutting wires, the arrangement according to which these wires are positioned and, in any case, the method with which said distance between wires is determined, assumes particular importance for this purpose.

The majority of manufacturers of multi-wire machines adopt a fixed pitch system, without the possibility of modulating the distance between cutting wires according to needs, and therefore specializing the machine for a single thickness of cut slabs (i.e. 20, 30, 40 mm and so forth).

To overcome this drawback, according to the aforesaid patent, at least one of said pulleys (called "guide pulley") presents a plurality of external circumferential grooves, disposed according to respective planes, for example orthogonal to the axis of this pulley, mutually spaced apart according to a constant pitch or distance, which is substantially the same as a standard metric measurement of reference for the thickness of the slabs to be cut. Each cutting wire is disposed and guided in one of said respective grooves of the guide pulley, so that the thickness of a finished slab, which is cut by two adjacent cutting wires, corresponds substantially to the value of said pitch multiplied by the number of free grooves of the guide pulley included between said two adjacent cutting wires performing the cut.

On the other hand, the use is known in a multi-wire machine of a guide pulley composed of a plurality of identical wheels, coaxial and juxtaposed side by side in a pack, in which spacers are interposed between contiguous wheels to vary the thickness of the slabs cut. In this arrangement, each wheel presents a rim circumferentially grooved by means of one or more grooves and comprising a pair of external lateral edges or sides (one for each lateral wall of the wheel) having reduced thickness, which—in a wheel with several grooves—is less than the thickness of an internal annular ridge between adjacent grooves. This configuration of the lateral edges or sides is adopted to maintain the pitch between subsequent grooves of adjacent wheels substantially constant, also taking into account the free space between these wheels. The limited thickness of the external lateral edges or sides of the wheel weakens the structure of its lateral walls, which during use must support and guide the diamond wire to prevent it from slipping outwards. Therefore, after a certain period of machining time of the wheel, a lateral wall subjected to the load of a diamond wire can yield, and therefore it no longer has a guide and the slabs cut by this wire lose—during cutting—their planarity, as the wire starts to diverge laterally.

Starting from the notion of this drawback, the present invention intends to provide a remedy.

The object of the present invention is to provide a sawing machine with a plurality of wire tools for cutting material in blocks, such as stone material, comprising a guide pulley composed of a plurality of wheels with the same diameter, coaxial and mutually adjacent in a pack, wherein the distance between contiguous cutting wires can be selectively varied, so as to perform cutting of slabs also having different predetermined thicknesses, ensuring correct and lasting guiding of these wires also at the lateral walls of the wheels.

With a view to this object, the present invention provides for a sawing machine with a plurality of wire tools for cutting material in blocks, such as stone material, the essential feature of which is described herein.

Further advantageous features are also described herein.

The aforesaid claims are intended as fully incorporated herein. The present invention will be more apparent from the detailed description below, with reference to the accompanying drawing, provided purely by way of non limiting example, wherein:

Figure 1:
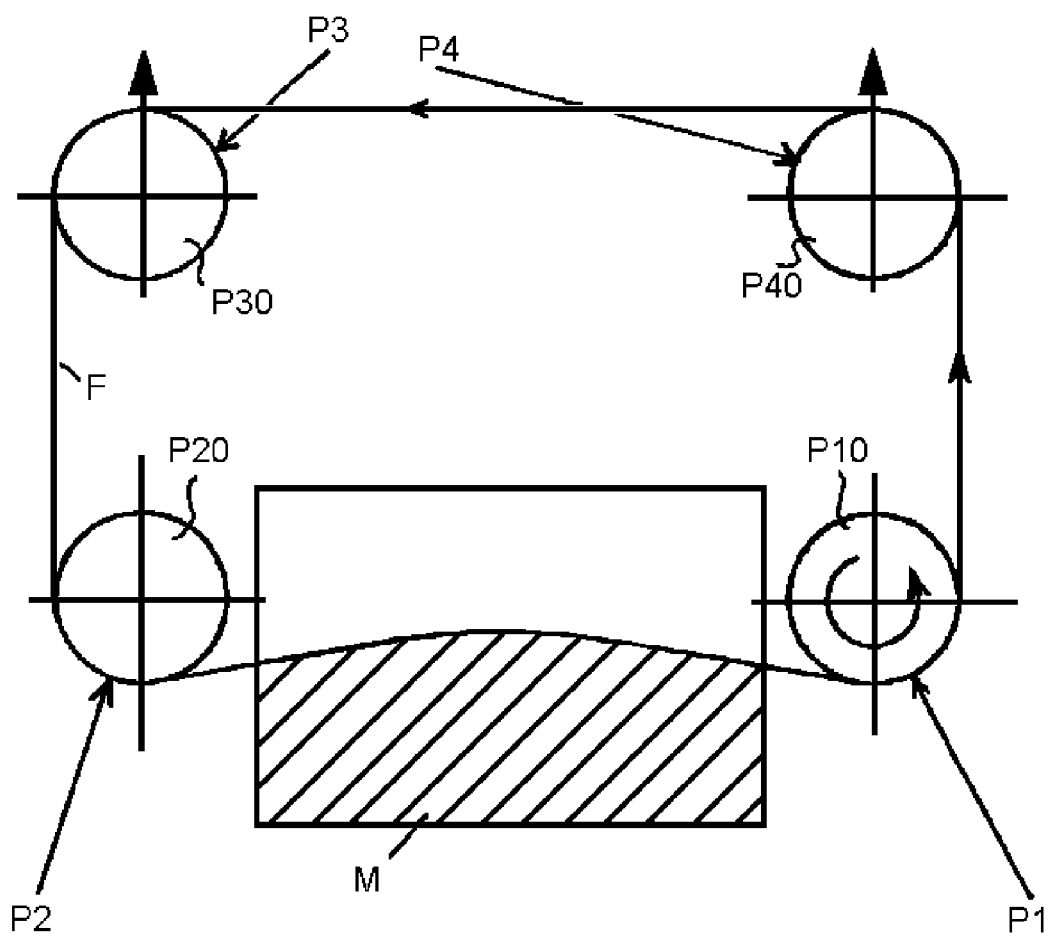
FIG. 1 is a schematic view in a vertical section of a sawing machine with a plurality of wire tools for cutting material in blocks, such as stone material, at a cutting wire made to circulate to cut a block of stone material between four pulleys or wheels.
Figure 2:
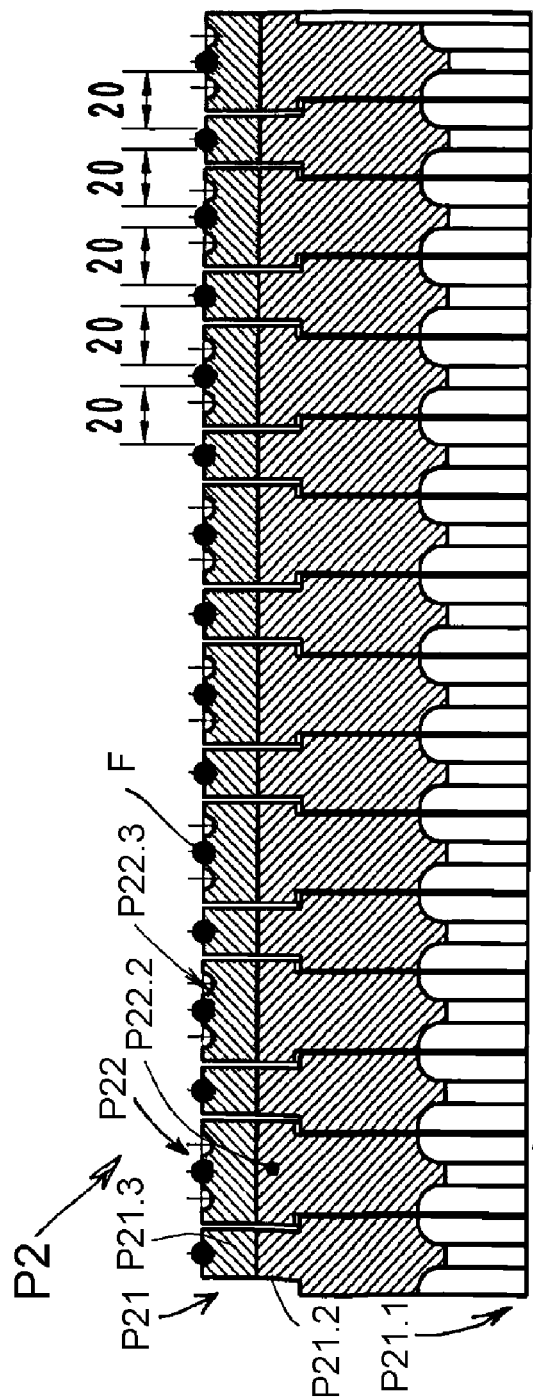
FIGS. 2 to 5 are respectively partial views in axial section of a guide pulley comprising a pack of grooved wheels and provided in the sawing machine of FIG. 1.
Figure 3:
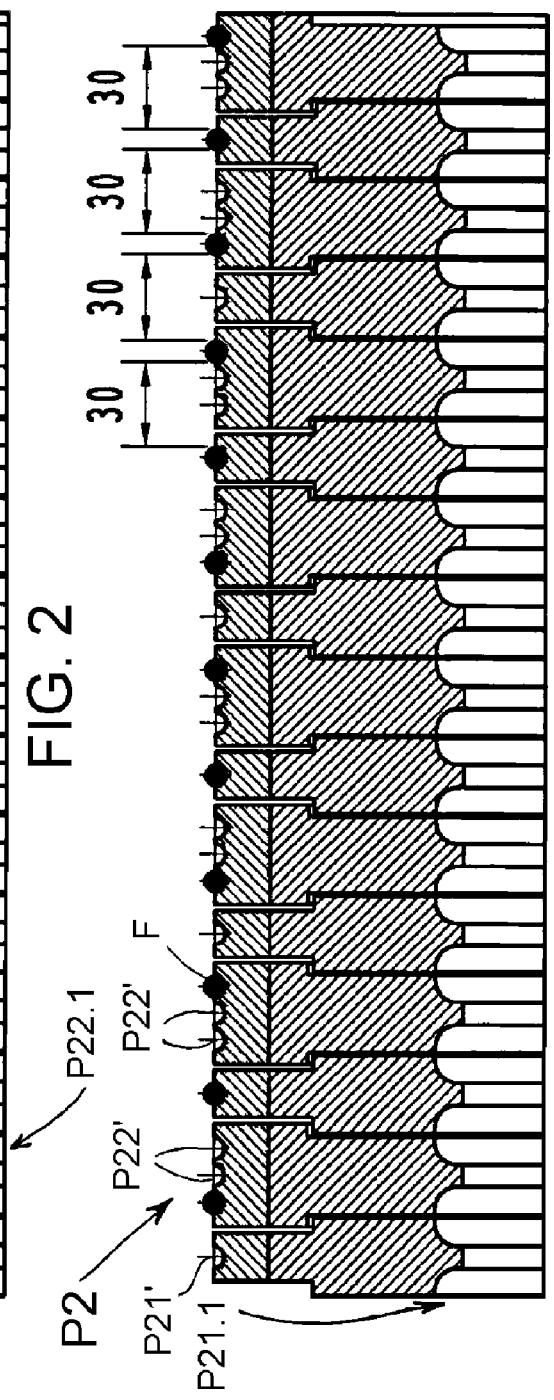
Figure 4:
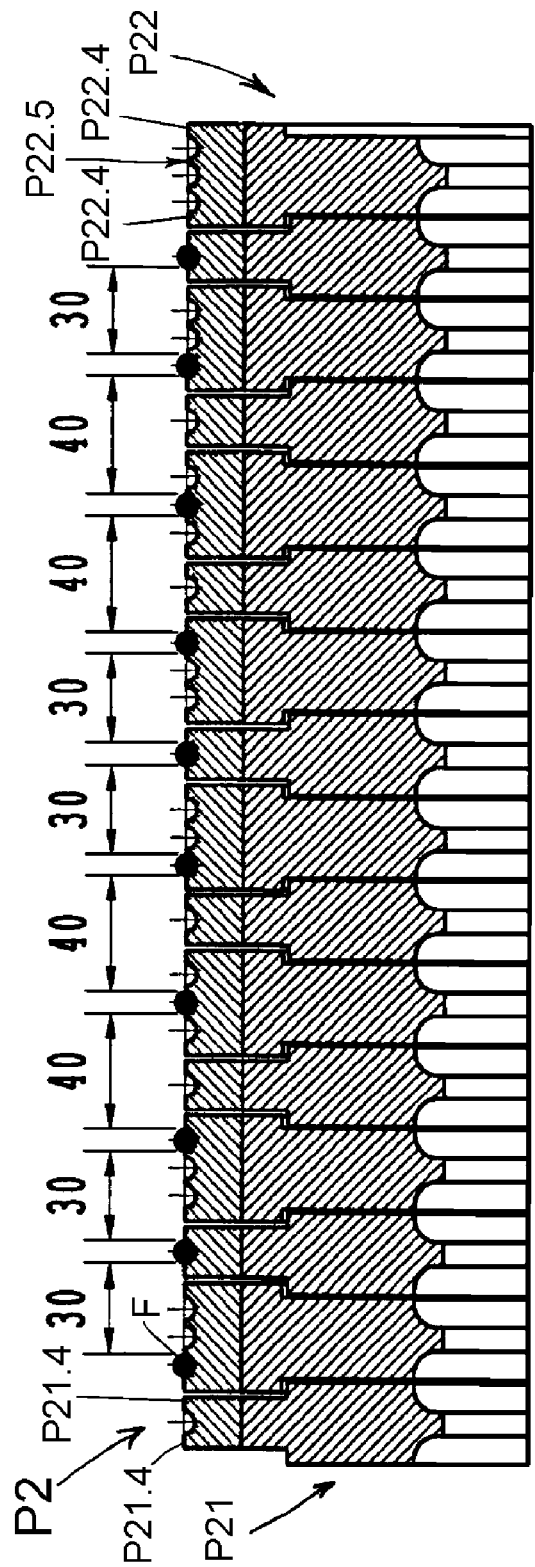

With reference to the accompanying drawing, FIG. 1 schematically shows a diamond wire F (hereinafter "cutting wire") wound in a closed loop on four wheels or pulleys mounted on respective shafts with substantially horizontal and parallel axes in a sawing machine (not further illustrated) with several wire tools for cutting a block of stone material M. Said cutting wire F is disposed in a respective vertical plane, substantially parallel to the planes on which the other cutting wires lie.

Said cutting wire F is, in particular, made to circulate in a respective groove P10 of a pulley P1 with a plurality of grooves, driving and for guiding the cut, mounted on a shaft with horizontal axis (not shown). Said cutting wire F is also guided by means of a respective idle wheel—indicated generically here with P20—of a wheel pack of a guide pulley P2, which comprises a plurality of wheels P20 of the same external diameter mounted coaxially on a respective shaft with horizontal axis (not shown) in a side by side arrangement. The lower branch of said wire F which performs cutting of the block M extends between the groove P10 of the driving pulley P1 and the guide wheel P20 of the guide pulley P2.

Two tensioning and idle wheels P30, P40 are located respectively above the groove P1 of the driving pulley P10 and of the guide wheel P20 of the guide pulley P2. These wheels belong to two corresponding wheel packs P3 and P4, supported coaxially and adjacent by means of relative shafts (not shown) with horizontal axes.

According to the invention, and with reference in particular to FIGS. 2 to 5, in said wheel pack of the guide pulley P2 a wheel P21 presenting an external circumferential groove P21' and a wheel P22 presenting a plurality of external circumferential grooves P22' (three grooves P22' in the example shown) are alternated in a repetitive sequence. All said wheels P21, P22 comprise a radially internal part, respectively P21.1, P22.1, for example having substantially the same thickness as that of all the other wheels, at which they are mutually juxtaposed in a pack. Moreover, each wheel P21 presenting a groove P21' comprises a radially external part P21.2 having an external annular rim P21.3 of lesser width than the thickness of the internal part P21.1 thereof, while each wheel P22 presenting a plurality of grooves P22' comprises a radially external part P22.2 having an external annular rim P22.3 of a width greater than the thickness of the internal part P22.1 thereof, and which overlaps, laterally, partially and in a freely revolving manner, the radially internal part P21.1 of each wheel P21 adjacent and presenting a groove P21'.

In said wheel pack of the guide pulley P2, the grooves P21', P22' of any two adjacent wheels P21, P22 present the respective vertical median planes mutually spaced apart according to a plurality of predetermined pitches or distances and substantially corresponding—taking account of the thickness of the cutting wires F and relative tolerances—to respective standard metric measurements of reference for the thickness of the slabs to be cut. In this manner, each cutting wire F arranged and guided in a respective groove P21', P22' of a wheel P21, P22 is distanced from the cutting wire F arranged adjacent in a groove P22', P21' of an adjacent wheel P22, P21 by a metric measurement substantially corresponding to a predetermined thickness of slab to be cut. Therefore, according to the groove P22' occupied by the cutting wire F in the wheel P22 presenting a plurality of grooves, the thickness of the corresponding slab cut from the block of material M is unequivocally determined, with respect to the adjacent cutting wire F which occupies the groove P21' in an adjacent wheel P21.

Figure 5:
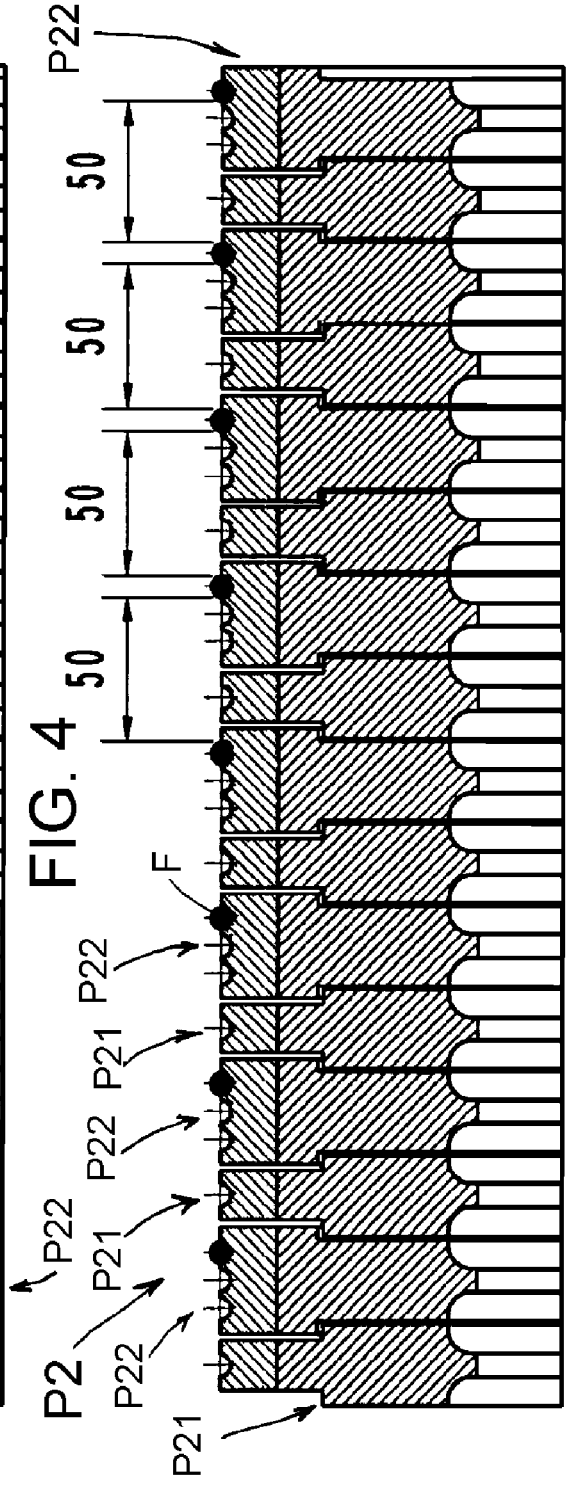

FIGS. 2 to 5 respectively show arrangements of cutting wires F, in adjacent pairs mutually spaced apart in the guide pulley P2 according to different predetermined pitches, for example of 20 mm (FIG. 2), 30 mm (FIG. 3), 30 mm and 40 mm (FIG. 4) and 50 mm (FIG. 5).

In said guide pulley P2, the lateral edges or sides P21.4, P22.4 of all said wheels P21, P22 present at least the same, or advantageously greater thickness, with respect to the thickness of each internal annular ridge P22.5 between adjacent grooves P22' in a wheel P22 with a plurality of grooves. This ensures lasting and correct guiding against divergence and/or lateral slipping of the cutting wires F which run in the grooves P21', P22' contiguous to the lateral walls of the wheels P21, P22. As is apparent from the above, the present invention allows, in an easy and efficient manner and with simple and safe means, the aforesaid objects to be achieved with consequent technical and economic advantages.

It may be noted in particular that the guide pulley 2 can be installed easily and rapidly, and allows the pitch between adjacent cutting wires F to be selectively varied just as easily and rapidly, to determine different thicknesses of slabs to be cut from the block of material M.

The invention claimed is:

1. A sawing machine with a plurality of wire tools for cutting material in blocks, comprising a guide pulley composed of a plurality of wheels of the same diameter, coaxial and juxtaposed side by side in a wheel pack on a corresponding shaft wherein said wheel pack of the guide pulley (P2) comprises a plurality of wheels (P21) each presenting at least an external circumferential groove (P21') and a plurality of wheels (P22) each presenting a plurality of external circumferential grooves (P22') alternated in a repetitive sequence, all of said wheels (P21, P22) comprise a radially internal part (P21.1, P22.1), at which they are mutually juxtaposed in the wheel pack, each wheel (P21) presenting at least a groove (P21') comprises a radially external part (P21.2) having an external annular rim (P21.3) of lesser width than the thickness of said internal part (P21.1) thereof, while each wheel (P22) presenting a plurality of grooves (P22') comprises a radially external part (P22.2) having an external annular rim (P22.3) of a width greater than the thickness of said internal part (P22.1) thereof, and which overlaps, laterally, partially and in a freely revolving manner, the radially internal part (P21.1) of each wheel (P21) adjacent and presenting at least a groove (P21'), and lateral edges or sides (P21.4, P22.4) of all said wheels (P21, P22) present at least the same thickness as the thickness of each internal annular ridge (P22.5) between adjacent grooves (P22') in a wheel (P22) with a plurality of grooves, so as to ensure lasting and correct guiding against divergence and/or lateral slipping of the cutting wires (F) which run in the grooves (P21', P22') contiguous to the lateral edges or sides of the wheels (P21, P22).

2. The sawing machine of claim 1, wherein, in said wheel pack of the guide pulley (P2), the grooves (P21', P22') of any two adjacent wheels (P21, P22) present respective vertical median planes mutually spaced apart according to a plurality of predetermined pitches or distances and substantially corresponding - taking account of the thickness of the cutting wires (F) and relative tolerances - to respective standard metric measurements of reference for the thickness of the slabs to be cut, so that each cutting wire (F) arranged and guided in a respective groove (P21', P22') of a wheel (P21, P22) is distanced from the cutting wire (F) arranged adjacent in a groove (P22', P21') of an adjacent wheel (P22, P21) by a metric measurement substantially corresponding to a predetermined thickness of slab to be cut.

3. The sawing machine of claim 2, wherein, according to the groove (P22') occupied by a cutting wire (F) in the wheel (P22) presenting a plurality of grooves, the thickness of the corresponding slab cut from the block of material (M) is unequivocally determined, with respect to the adjacent cutting wire (F) which occupies a groove (P21') in an adjacent wheel (P21) having at least one groove.

4. The sawing machine of claim 1, wherein the material in blocks is a stone material.

* * * * *